Figure 1:
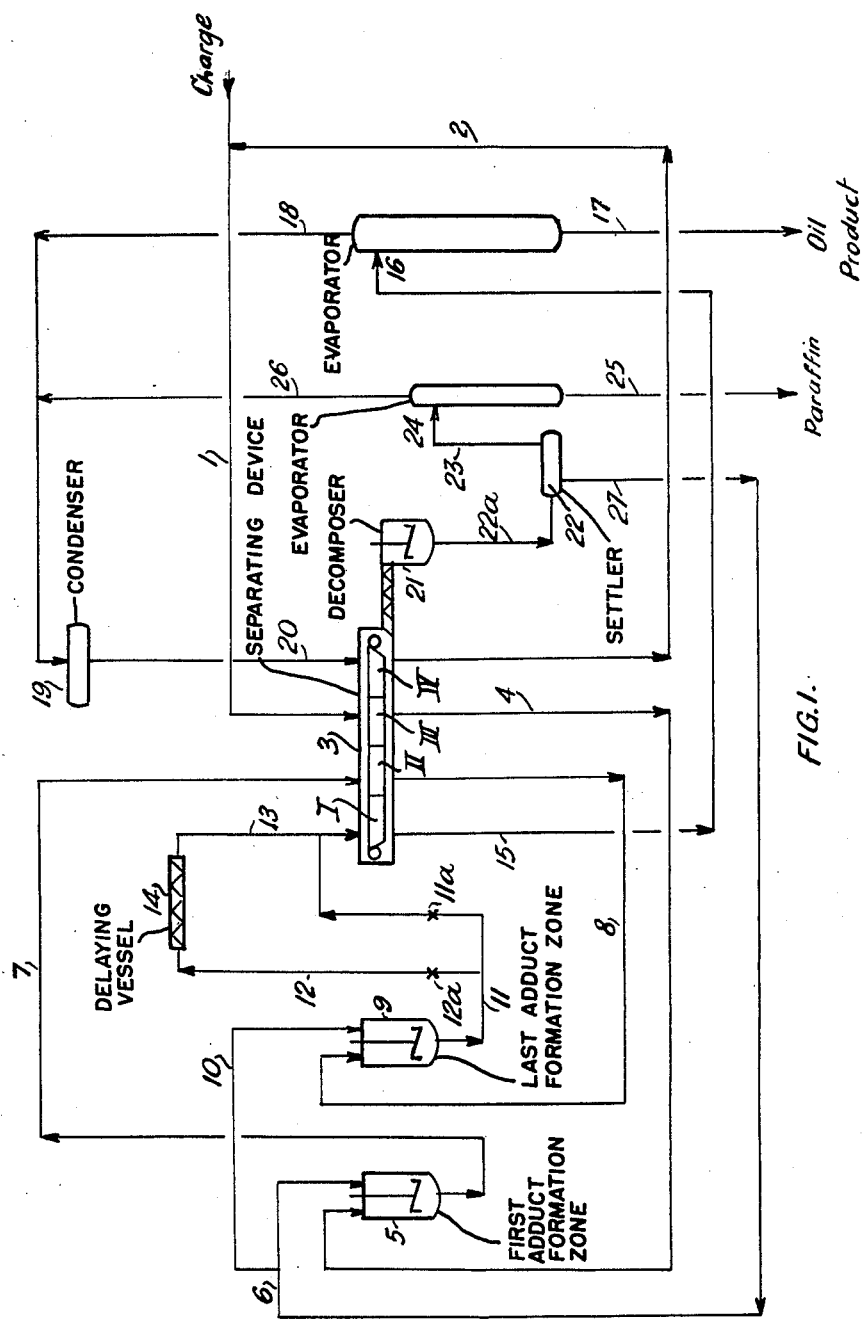

Inventors:
Alfred Hoppe,
Hermann Franz,
Kurt Meliss
and
Reinhold Gutberlet
By: Baldwin & Wight,
Attorneys

2,917,447

PROCESS FOR THE SEPARATION OF N-PARAFFINS FROM HYDROCARBON OILS

Alfred Hoppe, Frankfurt am Main, Hermann Franz and Kurt Meliss, Frankfurt am Main, Niederrad, and Reinhold Gutberlet, Sprenlingen, Germany, assignors to Edeleanu Gesellschaft m.b.H., Frankfurt am Main, Germany, a body corporate of Germany Application April 18, 1957, Serial No. 653,661

Claims priority, application Germany April 21, 1956

6 Claims. (Cl. 208—25)

The invention relates to the removal of paraffins from hydrocarbon oils by formation of adducts with the aid of urea. The formation of the adducts is preferably carried out in two steps, but the adducts thus formed are separated in a single separation apparatus from the filtrates so that the end products are obtained with the required degree of purity. The process enables the amount of urea and the amount of the required diluent to be kept as low as possible while ensuring optimum efficiency.

During the removal of paraffins from hydrocarbon oils by formation of adducts with urea, mixtures are obtained which can only be stirred and pumped with difficulty owing to their high solids content. The solids to liquid ratio becomes less workable with increased paraffin content, since, as is well known, about 3–4 parts of urea have to be applied per part of paraffin. The high solids content of the mixture has therefore been reduced by dilution with an oil solvent (i.e., oil-dissolving solvent) or with filtrate from which paraffins have been removed but the transport of the larger volume and the separation of the individual components involve increased energy costs.

It is also known to subdivide the amount of urea required for the desired degree of paraffin removal and to carry out the adduct formation in a number of steps. The liquid portions from the mixtures of the various adduct formation steps must however be individually separated and collected from the corresponding solids. For this purpose a number of filtration devices are required according to the number of steps. The capital expenditure and energy costs are correspondingly high, and render such a process expensive.

These difficulties are overcome by application of the proposed step process, in combination with the separation of adducts by a single operation in which the liquid portions or filtrates of the individual steps are separately obtained.

The process consists in that the charge diluted with an oil solvent is preliminarily treated to remove paraffins, stirred with a portion of the total amount of urea in an initial step of adduct formation, treated with a second portion of the total amount of urea after separation of the adduct thus formed in the final step, and the products of both steps are led into a separation device, wherein in a first filtration zone the mixture of the second step of adduct formation is separated into adduct with free urea and filtrate of the required pour point; in a second filtration zone the mixture of the first step of adduct formation is added to the urea-containing adduct from the second step of adduct formation, the filtrate is separated and led into the second step of adduct formation; in a third zone the charge diluted with wash filtrate is passed through the adducts of the first and second zone and the urea contained therein to give the adduct, the charge pre-treated to remove paraffins by this method is led into the first step of adduct formation, the adducts are washed in the following zone with fresh solvent, and the charge is diluted with wash filtrate.

The charge is diluted with a solvent, particularly if it is very viscous and contains much paraffin. Solvents are particularly employed which have a good dissolving power for the treated oil but not for paraffins and adducts such as chlorinated hydrocarbons or ketones etc.

The urea required for adduct formation is preferably added in the form of an aqueous solution saturated at 70° C. but it is also possible to select a different concentration or a different solvent for urea such as methanol, or to apply the urea in a solid form or just moistened with solvent. The amount of urea to be applied depends on the paraffin content of the charge or the desired pour points of the deparaffinated oil.

The process according to the invention is carried out in two essential operations: the formation of the adduct and the separation of the mixtures formed.

According to the invention the adduct formation is carried out in two steps, an initial step and a final step. The reason for this subdivision lies, as already mentioned, in the fact that owing to the high addition of urea the solids content in the adduct-oil mixture is so high that the stirring and transport of the mixture becomes extremely difficult. The amount of urea to be added is therefore subdivided in such a manner that approximately the same amount of solids is obtained in the initial and final step of adduct formation. For example, if 15 parts of paraffin have to be removed from a gas oil a total of 45 parts of urea must be added to the oil, involving the formation of 60 parts of solids. In order to obtain approximately the same amount of solids in both steps of adduct formation, the oil is stirred in each step with half the theoretical amount, that is with 22–23 parts of urea.

Fundamentally, the adduct formation proceeds the more rapidly the greater the excess of one of the two adduct components. When there is more paraffin than urea, the excess paraffins available which have the tendency to rapid adduct formation, combine with urea to form the adduct, so that the whole of the urea is reacted. On the other hand when there is more urea than paraffin available those paraffins which possess little tendency towards adduct formation are activated to form adducts by the available excess urea.

In order to create these useful conditions for a most rapid and complete adduct formation when running-in the plant the amount of urea added in the final step is larger than in the initial step, i.e. during the final step there is added a single excess above the calculated and required half amount of urea. The solids from this step therefore contain free, uncombined urea in addition to the adduct. These solids are then contacted with freshly introduced oil during the further course of the process. Therefore excess paraffin in the introduced oil now meets a small amount of urea so that the total amount of urea present in the solids combine spontaneously to form the adduct. The charge pretreated to remove paraffin in this manner is then treated in the initial step of adduct formation with half the theoretically required amount of urea so that even in this step an excess of paraffin meets urea and combines with it. If in the final step there is added again half the amount of urea required an excess of urea is now present since by removal of paraffin in pretreatment in the initial step more than half of the paraffins present in the charge have been combined to form an adduct and thereby removed, so that the combination of the paraffins still available is accelerated. The excess urea remaining in the solids is then combined again to form adduct with a fresh charge, and thus reacted completely. With a single addition of excess urea in the first run the most advantageous conditions for an adduct formation are obtained in the step process, the conditions being characterized by an excess of one or the other component as the case may be.

A single separating device serves for separating the solids from the liquid portions of the mixtures, from the individual steps of adduct formation. Any continuously operating filtering device which enables the liquid filtrates to be separately run-off can be employed as separating device, for example a belt filter or a segment filter. Use is preferably made of a travelling belt screen which consists of an endless, continuously travelling conveyor belt, e.g. of metallic gauze. This belt traverses four successive zones during the continuous movement. These zones possess separate collection devices and run-off members for the separated liquid portions. The travelling belt screen is advantageously enclosed in a casing to counteract losses by evaporation of the low-boiling oil solvent.

Since the pores of the sieve become gradually blocked by adduct during prolonged operation of the filter, the filter-belt after discharge of the solids and passing the reversing roller is led through a hot water washing trough at about 80° C. At this temperature the adhering adduct decomposes within a few seconds to urea solution and liquid paraffin. The urea solution and the bulk of super, natant paraffin is discharged through an overflow while the hot water is constantly renewed. The paraffin adhering to the filter belt is brushed off after leaving the washing trough by a brush device and the filter belt is thus cleaned.

The mixture from the final step of adduct formation, comprising paraffin-free oil, adduct, and uncombined urea, is fed onto the first filtration zone of the separating device and separated into solid and liquid portions. The latter, after removal of the oil solvent, constitutes one of the final products of the process in the form of a deparaffinated oil.

The solids remaining on the separating device proceed further to the second filtration zone where the product of the initial step is added. This mixture contains paraffins in addition to the adduct and the oil since the pre-deparaffinated charge has only been treated with half the amount of urea in the initial step. The solids in the mixture deposits above the solids from the final step which still contains uncombined urea. During the passage of the liquid portions of the mixture the paraffins present therein are partially converted into the adduct with the uncombined urea and remain in the seperating device while after passing through the second filtration zone the liquid is led into the final step of adduct formation. Here it is mixed again with half the amount of urea. As already mentioned above there is now an excess of urea which combines completely with paraffins to form an adduct and which still have to be separated to attain the required pour point.

When the separating device moves on, the solids which are deposited on top of each other still containing free urea as well as adduct are led into a third zone. Here they are contacted with the diluted oil feed. Since a part of the paraffins present in the charge spontaneously form adducts with urea, these are converted to the adducts by the urea present in the solids during the passage of the charge through the solids layer. Thus this preliminary treatment reduces the adduct-forming portion of the charge and also the solids portion of the initial step and the excess urea remaining in the final step is completely converted into the adduct in this third step.

On leaving this zone, however, liquid oil portions of the charge adhere to the surface of the adducts. This would increase the oil content of the paraffin to be separated to an undesirable extent. The solids are therefore washed free from oil with an oil solvent in a fourth zone. After separation the washing agent contains the adhered oil in solution. When this washing agent is mixed with the charge before it is added to the third zone the charge is diluted and the oil portion retained in the solids is returned.

On leaving the fourth zone the solids on the separating device practically contain only adduct and oil solvent. It is possible to introduce a drying zone at this stage, which is not considered here. After the fourth zone or a possible drying zone, the adduct leaves the separating device; it is transported to a decomposer and separated in known manner, for example by heating to about 80° C. into paraffin and urea solution. After evaporation of the adhering oil solvent the paraffin represents the second product of the process. The urea solution is then recirculated.

It has been established that some adducts have a tendency to adhere to the walls of the separating device. This reduces the filtration area and the movement of the solids.

This phenomenon did not occur, as has been observed, on plastics which exhibit a repellent action on encrusting components. It is therefore advantageous to manufacture the contact surfaces from such plastics, for example polyethylene, poly-tetrafluoroethylene, or Bakelite or to provide them with a layer of such plastic materials.

The proposed process has been explained in detail for a two-step process having an initial and final step of adduct formation. It is also possible to insert one or more intermediate steps between the initial and final step. In that case the amount of urea is subdivided into three, four, or more portions and added to the pretreated charge or the filtrates from the individual filtration zones. According to the number of steps of adduct formation, the number of filtration zones of the separation device must be appropriately increased.

Since the adduct formation between paraffins and urea proceeds at different rates depending on the chain length and structure of the paraffins, it may be advantageous to prolong the final step of the adduct formation in order to attain low pour points to be followed by a delaying step between the final step and the first zone of the separating device. Since vigorous stirring is not necessary at this stage the delaying step may consist for example of a delaying worm of corresponding length, in which by slow rotation of the worm the mixture of the final step is kept in slight motion and transported in the direction of the separating device.

The adduct formation proceeds very slowly with some oils, a phenomenon which can be attributed to the presence of inhibitors. In order to achieve nevertheless the adduct formation within technically permissible times an excess of urea is continuously added in both adduct formation steps, i.e. not merely once at the start.

If the capacity of the devices is sufficient it is, of course, also possible to operate without any excess of urea. In that case the passage of the charge oil through a third filtration zone of the separating device can be omitted.

Figure 2:
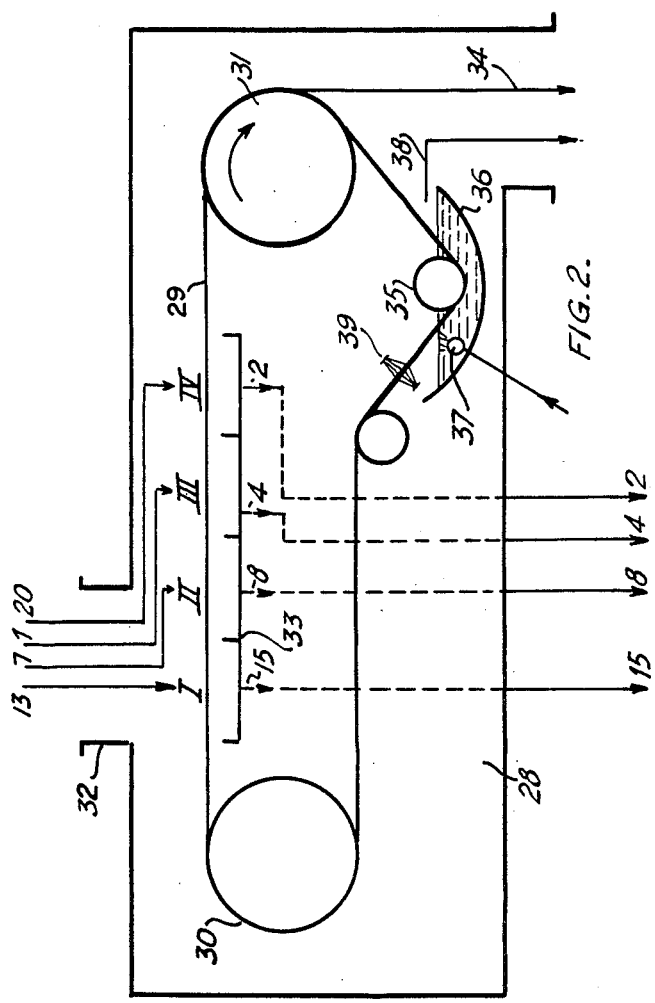

In the accompanying drawing, Figure 1 represents diagrammatically one method of carrying out the invention, and Figure 2, a modification thereof.

The feed oil diluted with wash filtrate from pipe 2 passes through the pipe 1 into the filtration zone III of the separating device 3, and then through the adduct mixture, and the pipe 4 into the mixer 5. In the mixer 5 the pre-treated feed oil is stirred with the first half-portion of the required amount of urea in the initial stage. The mixture is then directed through pipe 7 to the filter zone II of the separating device 3 from where the filtrate is pumped through pipe 8 towards the mixer 9. There, the second part of the adduct formation takes place: the feed oil pre-deparaffinated during its passage through the adduct mixture in the filter zone III and freed from half its paraffins in the mixer 5 is now contacted with the second half of the calculated amount of urea. During the running-in operations only, more than the required half portion of the urea is added, which proceeds together with the solids through the separating device and where it is combined to form an adduct in the zone III during the pre-deparaffinating of the feed oil. After the first passage only half the amount of urea is normally added. A mixture is obtained whose liquid portion exhibits the desired pour point and whose solid portion consists of adduct and free urea.

This mixture passes through the pipe 11 and the valve 11a into the filtration zone I of the separating device 3. The separating device which mainly consists of an endless travelling belt screen slowly moving through the zones I, II, III, IV, etc. separates the mixture into solids and filtrate. The filtrate flows through the pipe 15 and passes into an evaporator stage 16 where it is freed from the oil solvent. The bottom product is the finished oil and passes through the pipe 17 into the storage tank. The vapors from the oil solvent pass into the condenser 19 where they are liquified.

The adduct further proceeds with the travelling belt screen towards the zone II. It is covered there with the mixture from the mixer 5 (through the pipe 7). The liquid portions run off over the solids which are ready in position. A portion of the paraffins thereby combines with the free urea to form adducts which remain on the screen. The filtrate from the zone II still contains an appreciable quantity of paraffin and must therefore be passed through the pipe 8 into the mixer 9.

The adduct layer which now consists of adduct from the first and second stages of adduct formation passes from the filtration zone II into the filtration zone III. It is sprinkled from the pipe 1 with feed oil previously diluted with wash filtrate from the pipe 2. The great quantity of paraffins present in the feed oil practically completely convert the free urea still present in the mixture to adduct, while only an amount of paraffins corresponding to the free urea is removed from the feed oil. The filtrate is passed through the pipe 4 to mixer 5 for the first step of adduct formation and is there further treated as already described. The adduct which contains practically no further urea but to which oil portions adhere from the feed oil, is washed free from oil in the filtration zone IV with the aid of an oil solvent. The wash filtrate returns the washed-out oil portions to the feed oil through the tube 2.

The adduct proceeding from the filtration zone IV is therefore free from oil and urea, but still contains residual oil solvent. It is transferred directly or after passing a drying zone, not shown, to the decomposer 21. In the decomposer 21, the mixture is heated to temperatures of about 80° C. to decompose the adduct. The mixture of paraffin and urea solution flows through the pipe 22a to the settler 22, where the liquid paraffin separates out at the top and the urea solution at the bottom as clear layers.

The urea solution is transferred to the mixer 5 by the pipe 27 and used again for adduct formation. The liquid paraffins are withdrawn into the evaporator 24 through the pipe 23, where the oil solvent is distilled off. The vapors of the oil solvent are directed through the pipe 26 to the condenser 19 where they are condensed.

By passing through the pipe 20 the oil solvent can be directed to the filtration device 3 where it may be employed as washing agent.

The solvent-free paraffin runs through the pipe 25 into the storage tank.

The feed oil is thus freed from a small portion of the paraffins in the filtration zone III, flows to mixer 5 where it is treated with the first half-portion of the urea, and passes through the pipe 7 into the filtration zone II where it deposits its solids on top of the adduct running-off from filtration zone I, flows into the mixer 9 for the second treatment step where it is stirred with the second half-portion of urea, and then into the filtration zone I where it is separated into the adduct and the filtrate with the desired pour point. The filtrate leaves the apparatus through the evaporator station 16. The adduct from the mixer 9 is separated from the filtrate in the filtration zone I, proceeds to the filtration zone II where it is covered with the adduct from the mixer 5, and flows to the filtration zone III where the feed oil passes through the adduct from the filtration zones I and II; the urea-free adduct proceeds from the filtration zone III to the filtration zone IV where it is washed and from which it leaves the separating device.

Both operations indicate that in the various steps of the process there is always maintained an excess of one or other component.

In the penultimate filtration zone III the feed oil—i.e. a large excess of paraffin—meets a small amount of yet uncombined urea with the result that the free urea is converted to adduct practically completely and in a minimum of time. The pre-deparaffinated feed oil is only treated with a partial amount of urea in the first step of treatment (mixer 5). As a consequence, the urea added here is converted to adduct completely and in a short time. In the mixer 9 (final treatment of the oil) the second half-portion of urea is added, and owing to pre-deparaffinating in the zone III and the adduct formation in mixer 5 there is now an excess of urea in relation to the paraffins still present. It is thus ensured that the paraffins still remaining in the oil are combined to form adduct, with avoidance of processing periods which are not technically permissible; it is known that the rate of adduct formation greatly decreases towards the end of the reaction.

On the other hand the free urea still present in the adduct from the second stage of treatment (mixer 9 or filtration zone 1, respectively) is first contacted with the oil running off after covering the mixture from the first step of treatment (mixer 5 or filtration zone II); it contacts the feed oil in the filtration zone III. As already mentioned a little urea meets here an excess of paraffins.

The intense reduction in the rate of adduct formation at the end of the second stage of the treatment (mixer 9) renders it advantageous to introduce a delaying vessel 14 after the mixer 9 and before the separating device 3. The mixture from the mixer 9 is then led through pipe 11—while the valve 11a is closed—through the valve 12a and the pipe 12 to the delaying vessel 14 and from there through the pipe 13 to the separating device 3. This arrangement is advisable when the high speed of the travelling belt screen in the separating device 3 does not allow a time sufficient for a complete combination of the free urea in zone II and particularly in zone III. Admittedly the stay of the mixture in mixer 9 could be prolonged, but the disclosed arrangement saves a considerable amount of stirring energy: the mixer 9 must be intensively stirred while stirring is hardly necessary in the delaying vessel 14. For example it would suffice if the delaying vessel 14 were shaped in the form of a tube in which a slowly turning worm operates to transport the mixture.

Figure 2 shows an alternative way of mounting the travelling belt screen 3. It is located in a gas-tight casing 28 and comprises an endless filter belt 29, e.g. of metallic gauze, which runs over two reversing rolls 30 and 31. Through an aperture 32 the mixtures from the two mixing steps are passed through 13 and 7, respectively, the charge through the pipe 20 and the washing agent through pipe 20 are passed to the individual zones. In the schematically represented devices 33 the filtrates from the various zones are separately collected and passed through the pipes 15, 8, 4 and 2 as described above. The more or less dry adduct falls over a releasing roll 31 into the adduct discharge 34. After passing the roller 31 the filter belt is led over a return roller 35 into the washing trough 36 filled with hot water at about 80° C. The adduct adhering to the filter gauze is decomposed to urea solution and liquid paraffin. While the hot water is constantly renewed through the pipe 37, the urea solution and part of the paraffin is discharged through the overflow 38. A part of the supernatant paraffin is carried away by the filter belt as it leaves the washing trough. The filter belt is therefore passed over a brush device 39 which removes the paraffin and cleans the belt.

The process mainly serves for the separation of n-paraffins from paraffinic hydrocarbon oils such as kerosene, diesel oils, or engine oils.

Since it is known that thio-urea forms adducts with iso-paraffins or naphthenes in the same way as urea with n-paraffins or derivatives thereof, the process is also applicable to the adduct formation between thio-urea and iso-paraffins.

What is claimed is:

1. Method of separating paraffins from hydrocarbon oils containing them, by forming and separating adducts of the paraffins with an additive compound selected from the group comprising urea and thiourea, which comprises passing the hydrocarbon oil charge successively through a plurality of adduct formation zones; distributing said additive compound to each of said adduct formation zones from a supply at least equivalent to the theoretical amount required to form adducts with the paraffins to be separated; passing the resulting mixture containing hydrocarbon and adduct from each of said adduct formation zones to a corresponding one of a plurality of successive filtration zones in a common unitary separating device; continuously and cumulatively traversing the separated solids including adducts on a single filter medium successively through said filtration zones; conducting the individual hydrocarbon filtrates of each of said filtration zones forwardly to said successive filtration zones in a direction counter to that in which said separated solids including the adducts are traversed through said successive filtration zones; withdrawing the final filtrate as hydrocarbon product with the desired pour point; and decomposing the accumulating adduct to provide the additive supply and a paraffin product.

2. Method of separating paraffins from hydrocarbon oils containing them, by forming and separating adducts of the paraffins with an additive compound selected from the group comprising urea and thiourea, which comprises diluting the hydrocarbon oil charge with a solvent therefor; passing the diluted hydrocarbon oil charge successively through a plurality of adduct formation zones; distributing said additive compound to each of said adduct formation zones from a supply at least equivalent to the theoretical amount required to form adducts with the paraffins to be separated; passing the resulting mixture containing hydrocarbon and adduct from each of said adduct formation zones to a corresponding one of a plurality of successive filtration zones in a common unitary separating device; continuously and cumulatively traversing the separated solids including adducts on a single filter medium successively through said filtration zones; conducting the individual hydrocarbon filtrates of each of said filtration zones forwardly to said successive filtration zones in a direction counter to that in which said separated solids including the adducts are traversed through said successive filtration zones; extracting solvent for recycling from the final filtrate to provide a hydrocarbon product with the desired pour point; and decomposing the accumulating adduct to provide the additive supply and a paraffin product.

3. Method according to claim 2, wherein the additive compound comprises urea, and excess urea is initially provided in the final adduct formation zone, the separated solids are caused to traverse two further successive filtration zones in said separating device, solvent is passed through the last said filtration zone to wash entrained oil from the adducts, the filtrate from said last filtration zone is added to original hydrocarbon charge and the resulting mixture is passed through the penultimate filtration zone, whereby excess urea in the solids forms adducts with paraffin in the charge and the latter constitutes the diluted hydrocarbon charge.

4. Method according to claim 3, wherein subsequently to the provision of initial excess the urea is distributed substantially equally among the adduct formation zones.

5. Method according to claim 4, wherein the product of the final step of adduct formation is only gently stirred and is subjected to a delaying step before entering the separating device.

6. Method according to claim 5, wherein the separated solids are carried through successive filtration zones on a travelling belt filter screen running within a gas tight casing.

References Cited in the file of this patent

UNITED STATES PATENTS

| | | |
|---|---|---|
| 2,197,770 | Pruyn | Apr. 23, 1940 |
| 2,464,440 | Delius | Mar. 15, 1949 |
| 2,642,424 | Gorin et al. | June 16, 1953 |
| 2,723,220 | Axe | Nov. 8, 1955 |